United States Patent [19]

Toor

[11] Patent Number: 5,542,614
[45] Date of Patent: Aug. 6, 1996

[54] PROCESSING OF WASTE MATERIAL

[75] Inventor: Irfan A. Toor, Plano, Tex.

[73] Assignee: Itex Environmental Services, Inc., Addison, Tex.

[21] Appl. No.: 193,449

[22] Filed: Feb. 8, 1994

[51] Int. Cl.$^6$ .......................... B02C 18/40; B02C 23/18
[52] U.S. Cl. .......................... 241/21; 241/24.12; 241/25; 241/29
[58] Field of Search .................................. 241/21, 24, 25, 241/29, 38, 42, 81, 101.2, 101.6, DIG. 38, 186.2, 186.4

[56] References Cited

U.S. PATENT DOCUMENTS

| | | |
|---|---|---|
| 4,509,696 | 4/1985 | Donaldson ................................. 241/15 |
| 4,812,205 | 3/1989 | Silveri et al. .............................. 162/4 |
| 4,884,756 | 12/1989 | Pearson ..................................... 241/42 |
| 5,007,590 | 4/1991 | Taylor ....................................... 241/25 |
| 5,028,010 | 7/1991 | Sansing ..................................... 241/101 |
| 5,048,766 | 9/1991 | Gaylor et al. ............................. 241/65 |

Primary Examiner—John Husar
Attorney, Agent, or Firm—Warren & Perez

[57] ABSTRACT

An apparatus and method for chemically and physically stabilizing contaminated soil is disclosed. The soil is homogenized in a homogenizer; dropped into a mixer below the homogenizer and mixed with an additive; then dropped to a processing terminus located below the mixer. The apparatus and method are useful for processing highly clumped and/or acidic soil, e.g., soil contaminated with mining waste.

6 Claims, 5 Drawing Sheets

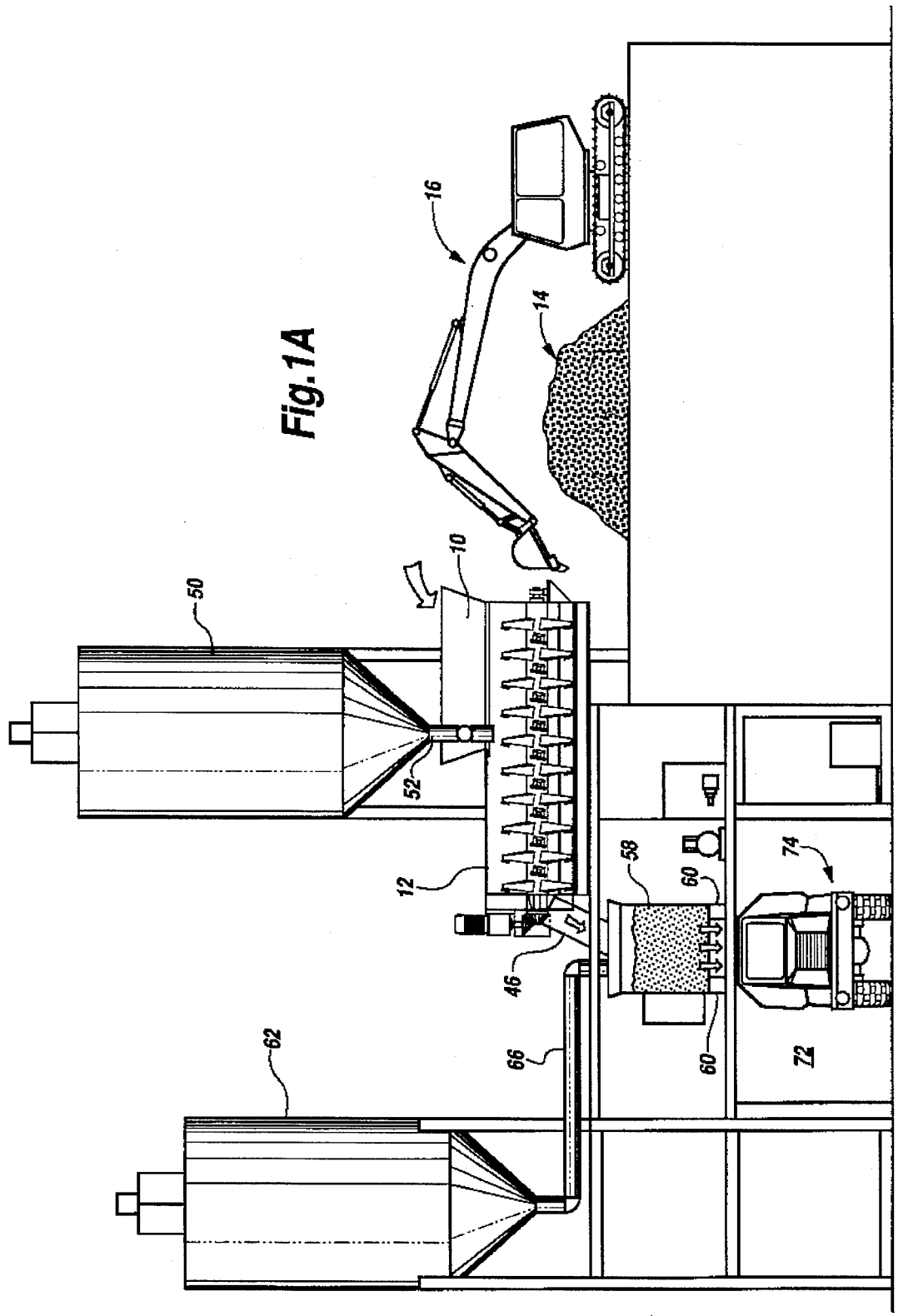

PROCESSING OF WASTE MATERIAL

BACKGROUND OF THE INVENTION

This invention relates to remediation processing of contaminated soil.

In remediation processing, soil which is polluted, toxic, or otherwise contaminated is rendered stable—either chemically, physically, or both—by mixing the soil with additive. U.S. Pat. Nos. 5,007,590 and No. 5,028,010, which are incorporated by reference disclose examples of remediation processing apparatuses and methods.

SUMMARY OF THE INVENTION

In general, in a first aspect, the invention features processing waste material by homogenizing the waste material in a homogenizer; dropping the waste material after mixing into a mixer located below the homogenizer; mixing the waste material with an additive in the mixer to form a mixture; and dropping the mixture to a processing terminus located below the mixer.

Embodiments of the invention may include one or more of the following features. The waste material may be solid or semi-solid. Lumps of waste material larger than a predetermined size may be removed before the waste material is processed. Waste material may be loaded into the homogenizer using an excavator, a conveyor, or a bulldozer. The waste material may be mixed with a pretreatment additive in the homogenizer. A batch of waste material may be accumulated in the mixer. The waste material may be weighed in the mixer, to determine an amount of additive to be added. The processing terminus may be a vehicle.

In general, in another aspect, the invention features apparatus for processing waste material. The apparatus includes a homogenizer; a mixer located below the homogenizer to receive waste material from the homogenizer by gravity feed; and a processing terminus located below the mixer to receive waste material from the mixer by gravity feed.

Embodiments of the invention may include one or more of the following features. The apparatus may include a loading conveyor with a discharge end disposed to deliver waste material to the homogenizer. The waste material may be solid or semi-solid. The homogenizer includes homogenizing augers which counter-rotate. The apparatus may include an additive receptacle and means for transferring additive from the receptacle to the homogenizer. The mixer includes mixing augers which counter-rotate, as well as weight sensing elements. The apparatus includes an additive receptacle and means for transferring additive from the receptacle to the mixer. The processing terminus includes space below the mixer which allows entry of a vehicle below the mixer to receive and transport the processed waste material from the apparatus.

The invention provides a method and apparatus useful for processing soil which is heavily clumped and/or acidic, e.g., soil contaminated with mining waste. Mining waste tends to cause the soil to form clumps which can abrade and "jam" the transfer pumps and augers which may be used in soil processing apparatuses. The acidic nature of such soil further degrades the transfer mechanisms. The present invention alleviates such problems.

Other advantages and features will be apparent from what follows.

DESCRIPTION

FIGS. 1A and 1B are side elevational and plan views, respectively, of a waste processing apparatus;

Figure 1B:
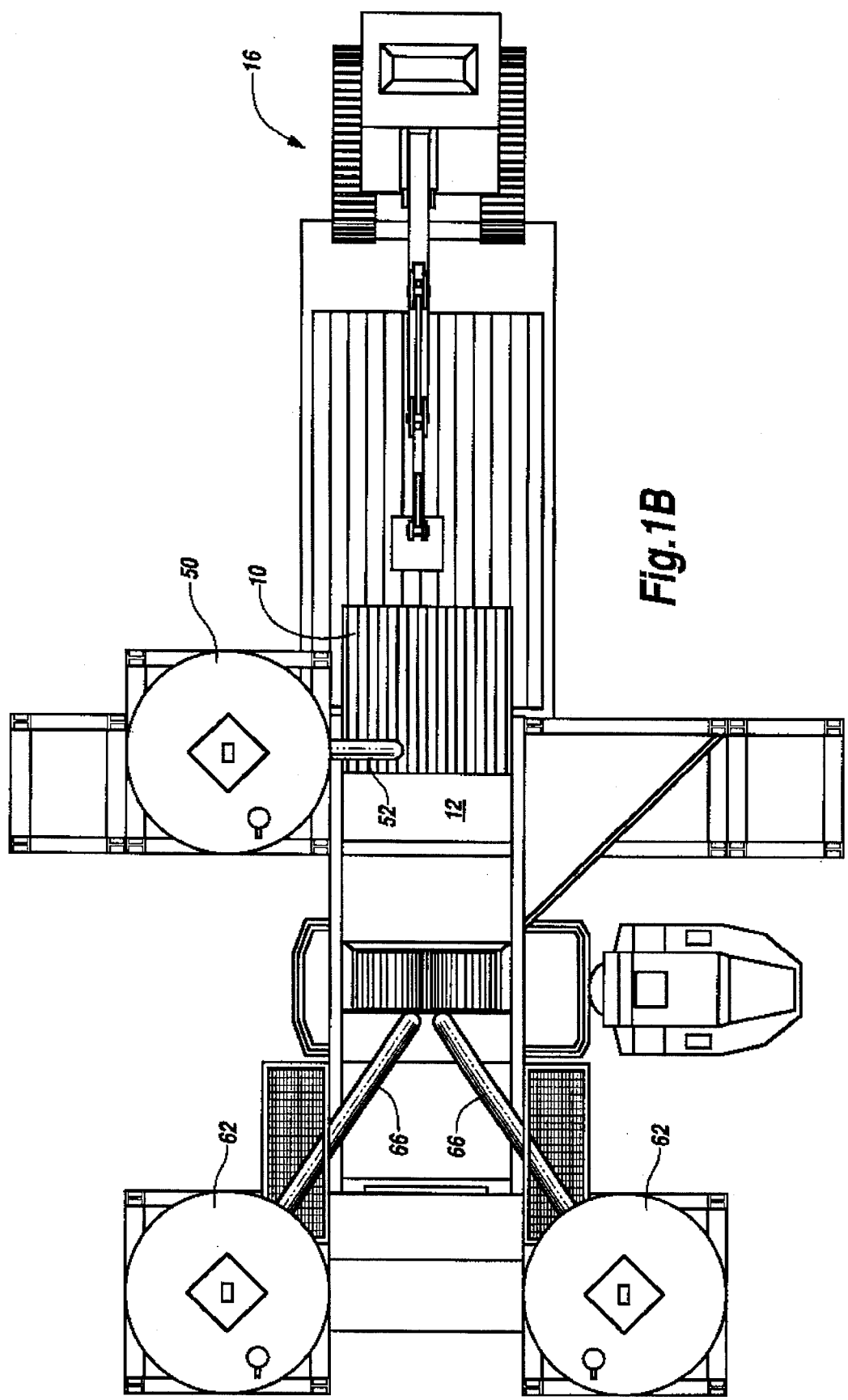

Solid or semi-solid waste material (e.g., contaminated soil) to be processed is loaded into a loading hopper 10 of an homogenizer 12 (FIGS. 1A, 1B). By solid or semi-solid, it is meant that the soil consistency may range from dry and totally solid to flowable—e.g., sludge-like—with as little as 5%, by weight, solid chunks. The waste material may be scooped up from a supply dump 14 previously deposited near the loading hopper, or from a sludge pit (not shown), and loaded into the loading hopper using an excavator 16. Alternatively, waste may be loaded into a loading hopper 18 (FIG. 2), which deposits the waste material onto a conveyor 20. Conveyor 20 transports the waste material from loading hopper 18 up to loading hopper 10 of the homogenizer 12. In another alternative, a soil processing facility can be built to take advantage of the natural slope of a hill 22 (FIG. 3), at the top of which is contaminated soil 26. The homogenizer 12 would then be positioned in a recess 24 in the hillside and waste material 26 would be pushed directly into loading hopper 10 using a bulldozer 28.

Soil contaminated with mining wastes typically contains about 60% metal, 20% moisture, and 20% clay or other organic constituents. The contaminated soil does not mix well with water and tends to form large, aggregate chunks which can "jam" the homogenizer. Thus, it may be necessary to pre-screen these large chunks of material from the contaminated soil.

Figure 3:
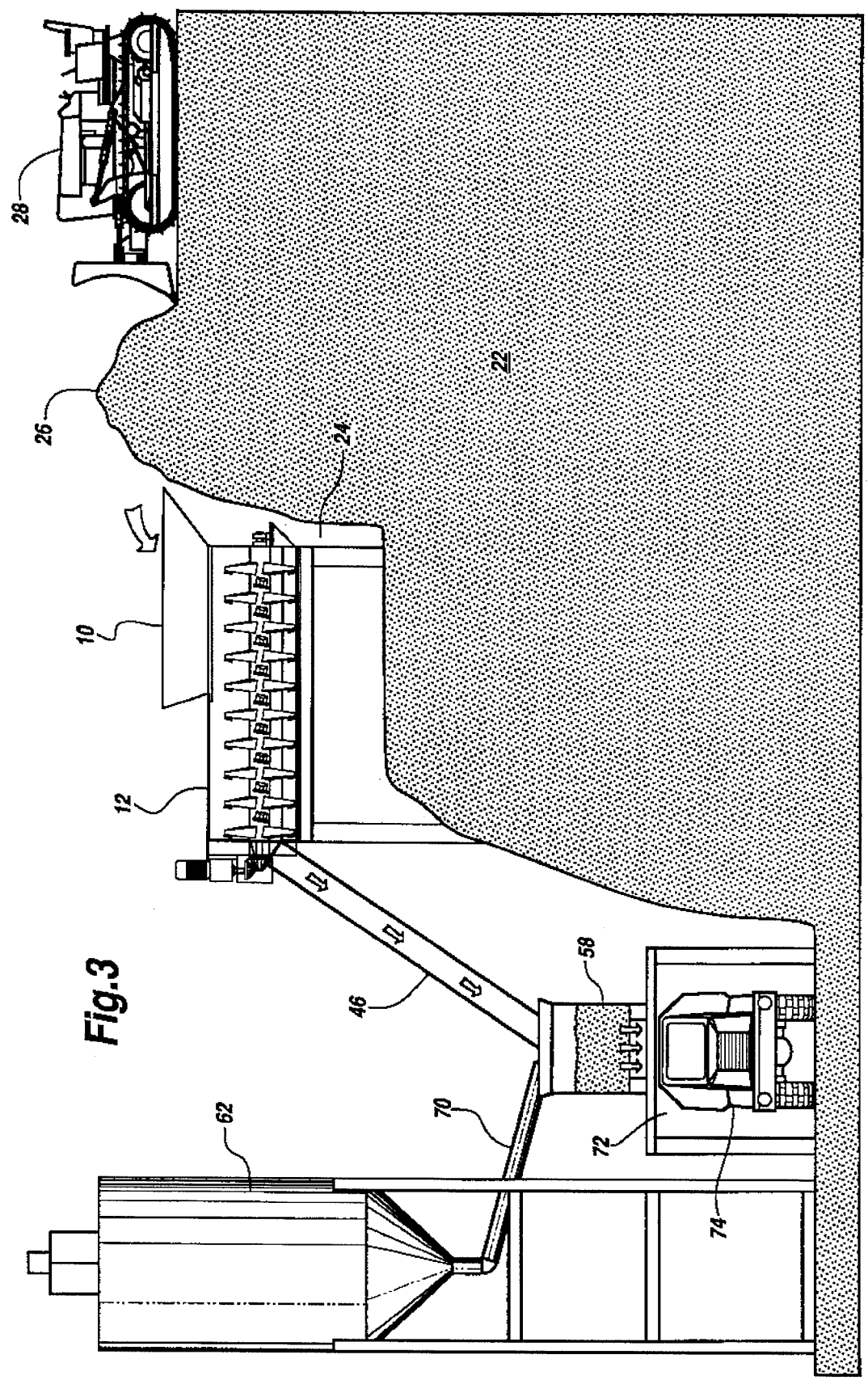
Figure 4:
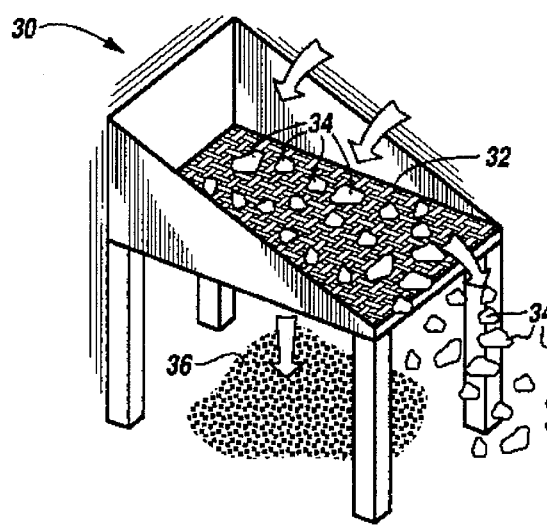
FIG. 4 is a perspective view of a vibrating screen box.

A vibrating screen box 30 (FIG. 4) prescreens the contaminated soil. The vibrating screen box, caused to vibrate by a mechanical shaker (not shown), has a slightly sloped mesh bottom 32 with openings of a desired size, e.g., six inches across. Chunks of waste material 34 which are larger than the openings bounce off to the side of the screen box, and the remainder of the waste material 36 passes through the vibrating screen box when it vibrates. The vibrating screen box may be located on site such that the waste material which passes through it piles up immediately in front of the homogenizer, e.g., mound 14 (FIG. 1A) or mound 26 (FIG. 3). Alternatively, the vibrating screen box may be located over loading hopper 18 (FIG. 2) such that the waste material passing through the screen box 36 is loaded directly into the loading hopper 18.

Figure 5A:
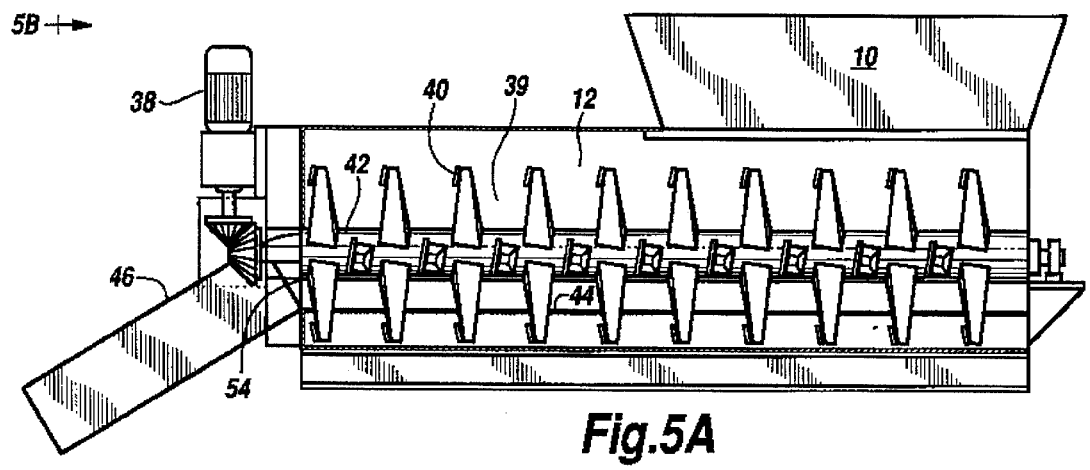
FIGS. 5A and 5B are a side view and an end view, respectively, of the waste processing homogenizer.
Figure 5B:
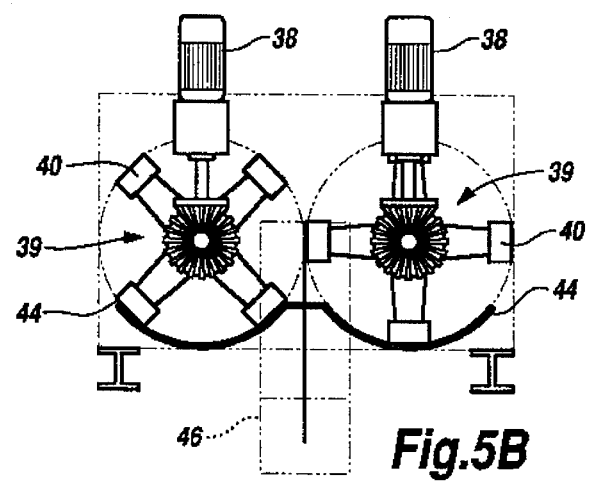

As shown more clearly in FIGS. 5A and 5B, homogenizer 12 has a pair of side-by-side homogenizing augers 39. Each of the homogenizing augers includes homogenizing paddles 40 that are welded or otherwise mounted to a shaft 42 at appropriate angles to cause movement of the waste material through the homogenizer while chopping, reducing the size of lumps in, and homogenizing the waste material. The homogenizing augers are positioned within semicircular troughs 44, which facilitate the chopping action of the paddles as waste material is conveyed to the discharge end of the homogenizer.

The homogenizing augers are driven by hydraulic motors, 38, which are independently powered such that the homogenizing augers may be counter-rotated. Counter-rotation causes the waste material to circulate within the homogenizer until adequate homogenization is obtained.

Often, mining waste is highly acidic due to the metals which are present. To prevent corrosion of the homogenizer, a pretreatment additive such as CaO (hot lime) or other basic material is mixed with the waste material while it is in the homogenizer. Enough pretreatment additive is added to raise the pH from a value on the order of 4 to a value on the order of 8 or 9.

Figure 2:
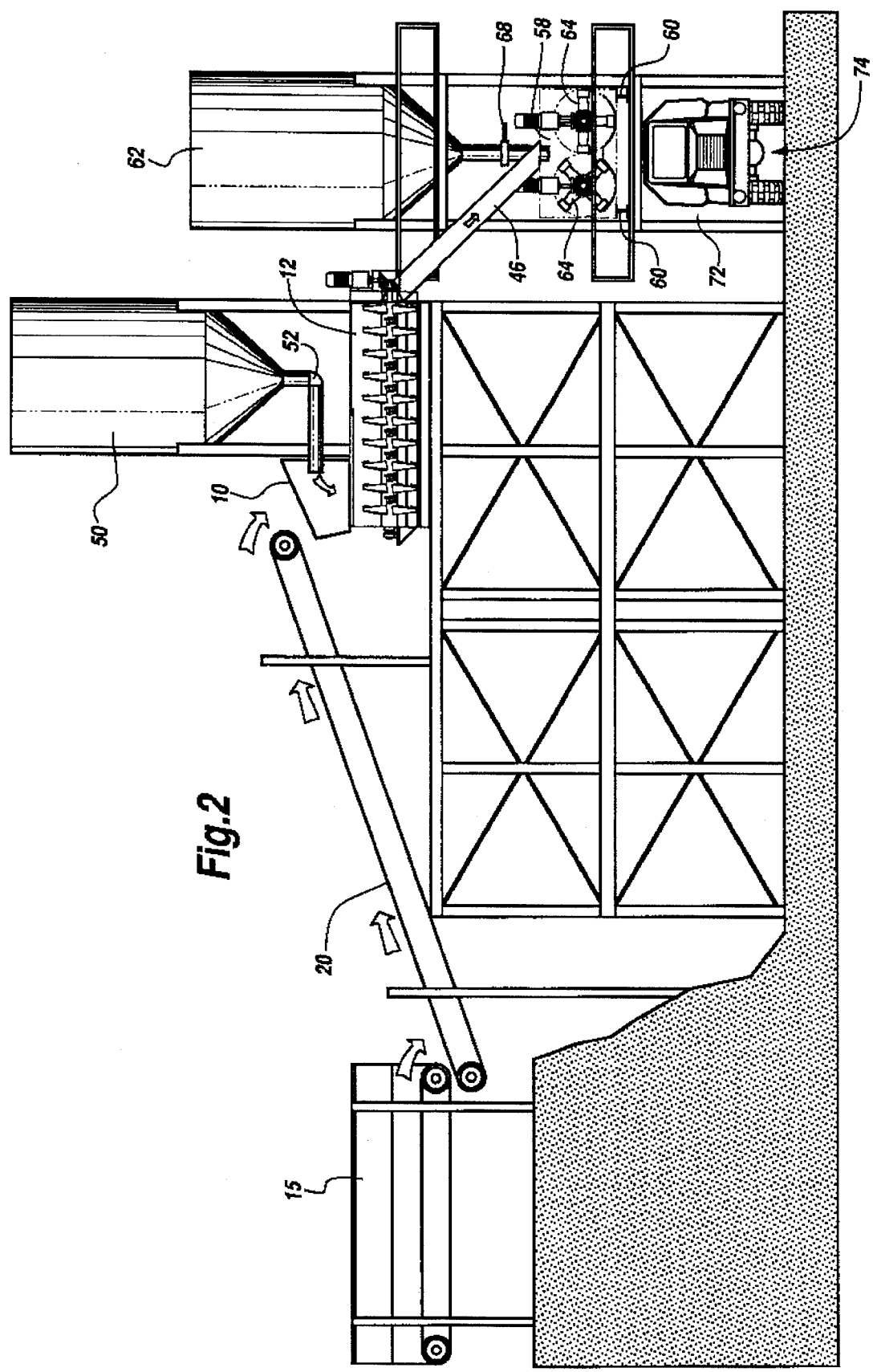
FIGS. 2 and 3 are side elevational views of alternative schemes.

The pretreatment additive is stored in an additive silo 50 located above the homogenizer (FIGS. 1, 2). Screw augers 52 (hidden in the Figures) transport the pretreatment additive from the silo either directly into the homogenizer (FIGS. 1A, 1B), or into loading hopper 10 (FIG. 2).

Once the desired consistency and degree of homogenization have been achieved, the waste material is discharged from the homogenizer through a hydraulically operated slide gate 54 (FIG. 5A). The waste drops, by gravity, through discharge chute 46 into a mixer 58 located below the homogenizer. Waste material is dropped into the mixer until a batch weight has been loaded into the mixer, as determined by load cells 60 on which the mixer is mounted.

The mixer may be of the kind used for concrete mixing (e.g., a "Compulsory Mixer" available from BHS/Ross). The mixer has a pair of mixing augers 64 positioned side-by-side within the mixer (FIG. 2). The mixing augers are independently controlled for counter-rotation, like the homogenizing augers, to circulate the waste material within the mixer.

One or more silos 62 store treatment additive to be mixed with the waste material. The treatment additive is calcium oxide (hot lime), calcium carbonate, some other type of lime, or other basic material which neutralizes the acidity of the waste material (hidden in the Figure). Additive is transferred from silo(s) 62 to the mixer by transfer means such as conventional screw augers 66 (FIGS. 1A, 1B); a butterfly valve-controlled drop chute 68 (FIG. 2); or a slide chute 70 (FIG. 3). The type and amount of specific additive(s) needed for a given weight of waste material of a given type is determined by experimentation. Once the waste material is loaded into the mixer and weighed, the amount of additive necessary to treat the waste material is determined and added to the mixer.

Once the required amount of additive has been added to the waste material, the waste material/additive mixture is retained and mixed in the mixer until the desired consistency and degree of mixing have been obtained. The mixture is then discharged from the mixer by retracting slide gates located in the bottom of the mixer (not shown) and allowing the mixture to drop, by gravity, to a processing termination location 72. The processing termination location is a truck access pit which is large enough to permit a waste-hauling truck 74 to drive under the mixer and receive the waste/additive mixture as it drops from the mixer. The mixture is then hauled away to a permanent disposal facility.

Other embodiments are within the scope of the following claims. For example, many other additives known in the remediation art such as portland cement, sodium hydroxide, and sodium sulfide can be used, depending on the nature of the material being remediated, and the invention is not to be limited by the particular additive used.

What is claimed is:

1. A method for processing waste material comprising the steps of:

receiving said waste material in a vibrating screen box;

vibrating said vibrating screen box to separate lumps of said waste material that are larger than a predetermined size thereby removing lumps of said waste material of a size greater than said predetermined size from said waste material;

discharging said waste material of a size less than said predetermined size into a homogenizer;

receiving said waste material into said homogenizer;

homogenizing said waste material in said homogenizer;

dropping said waste material into a mixer after homogenizing, said mixer located below said homogenizer;

accumulating a batch of waste material in said mixer;

weighing said batch of waste material to determine an amount of additive to be added to said waste material;

mixing said waste material with said additive in said mixer to form a mixture; and dropping said mixture from said mixer to a processing terminus located below said mixer.

2. The method of claim 1 wherein said waste material is solid or semi-solid.

3. The method of claim 1 further comprising after the step of receiving said waste material into said homogenizer:

adding a pretreatment additive to said waste material in said homogenizer; and mixing said waste material together with said pretreatment additive in said homogenizer.

4. The method of claim 1 wherein said processing terminus comprises a vehicle.

5. A method for processing acidic waste material of the kind that is characterized by having large lumps comprising the steps of:

loading said waste material in a vibrating screen box having a slightly sloped mesh screen and having openings of a desired size;

vibrating said vibrating screen box to separate lumps of said waste material that are larger than a predetermined size thereby removing lumps of said waste material of a size greater than said predetermined size from said waste material;

discharging said waste material of a size less than said predetermined size into a homogenizer:

receiving said waste material into said homogenizer;

adding a basic pretreatment additive to said waste material in said homogenizer;

mixing said waste material together with said basic pretreatment additive in said homogenizer:

homogenizing said waste material using counter-rotating augers in said homogenizer:

dropping said waste material by gravity from said homogenizer into a mixer located below said homogenizer, after said waste material has been homogenized;

accumulating a batch of said waste material in said mixer;

weighing said batch of waste material to determine an amount of basic additive to be added to said waste material in said mixer;

adding said amount of basic additive to said waste material in said mixer after said batch has been accumulated;

mixing said waste material with said additive in said mixer using counter-rotating augers to form a mixture; and dropping said mixture from said mixer into a truck located below said mixer.

6. The method of claim 5 wherein said waste material is solid or semi-solid.

* * * * *

(12) EX PARTE REEXAMINATION CERTIFICATE (7889th)
United States Patent
Toor

(10) Number: US 5,542,614 C1
(45) Certificate Issued: Nov. 30, 2010

(54) PROCESSING OF WASTE MATERIAL

(75) Inventor: Irfan A. Toor, Plano, TX (US)

(73) Assignee: TDM America, LLC, Addison, TX (US)

Reexamination Request:
No. 90/009,480, Jun. 5, 2009

Reexamination Certificate for:
Patent No.: 5,542,614
Issued: Aug. 6, 1996
Appl. No.: 08/193,449
Filed: Feb. 8, 1994

(51) Int. Cl.
*B02C 23/18* (2006.01)
*B02C 11/08* (2006.01)

(52) U.S. Cl. .................. 241/21; 241/24.12; 241/25; 241/29

(58) Field of Classification Search ............ 241/21
See application file for complete search history.

(56) References Cited

U.S. PATENT DOCUMENTS

| | | |
|---|---|---|
| 3,947,284 A | 3/1976 | Kitsugi et al. |
| 3,975,266 A | 8/1976 | Baize |
| 4,129,449 A | 12/1978 | Kojima |
| 4,149,968 A | 4/1979 | Kupiec et al. |
| 4,230,568 A | 10/1980 | Chappell |
| 4,443,260 A | 4/1984 | Miyoshi et al. |
| 4,460,292 A | 7/1984 | Durham et al. |
| 4,465,518 A | 8/1984 | Miyoshi et al. |
| 4,482,271 A | 11/1984 | Mitchell et al. |
| 4,504,321 A | 3/1985 | Kapland et al. |
| 4,539,121 A | 9/1985 | Kapland et al. |
| 4,744,829 A | 5/1988 | Eirich et al. |
| 5,028,010 A | 7/1991 | Sansing |
| 5,055,196 A | 10/1991 | Darian et al. |
| 5,240,608 A | 8/1993 | Gurfinkel et al. |
| 5,266,494 A | 11/1993 | Lahoda et al. |
| 5,304,710 A | 4/1994 | Kigel et al. |

OTHER PUBLICATIONS

EPA publication No. EPA/540/A5–89/011 entitled "Chemfix Technologies, Inc. Solidification/Stabilization Process, Applications Analysis Report" published May 1991.

EPA publication No. EPA/540/A5–89/011a entitled "Technology Evaluation Report, Chemfix Technologies, Inc. Solidification/Stabilization Process Clackmas, Oregon" published Sep. 1990.

EPA publication entitled "Superfund Innovative Technology Evaluation (Site) Program, Videotape S3" dated Apr. 1992.

Video entitled "United States Environmental Protection Agency Chemfix Technologies, Inc. Process Demonstration."

Slides from a Presentation entitled "Chem–Matrix$^{SM}$ Stabilization Equipment For Remediation" by dick Ayen, dated Nov. 26, 1990.

EPA publication No. EPA/540/AR–92/010 entitled Silicate Technology Corporation's Solidification/Stabilization Technology for Organic and Inorganic Contaminants in Soils Applications and Analysis Report, published Dec. 1992.

EPA publication No. EPA/625/6–85/006 entitled "Handbook, Remedial Action at Waste Disposal Sites (Revised)," published Oct. 1985.

EPA publication No. EPA/540/2–86/001 entitled "Handbook for Stabilization/Solidification of Hazardous Wastes," published Jun. 1986.

Davis Modular Pugmill Plants—Features and Options for High Capacity and Top Performance For Your Application; David Pubmill, Inc.; dated Mar. 1990; Columbia, TN.

Screen–All Model RD 40 Specifications sheet.

*Primary Examiner*—Joseph A. Kaufman

(57) ABSTRACT

An apparatus and method for chemically and physically stabilizing contaminated soil is disclosed. The soil is homogenized in a homogenizer; dropped into a mixer below the homogenizer and mixed with an additive; then dropped to a processing terminus located below the mixer. The apparatus and method are useful for processing highly clumped and/or acidic soil, e.g., soil contaminated with mining waste.

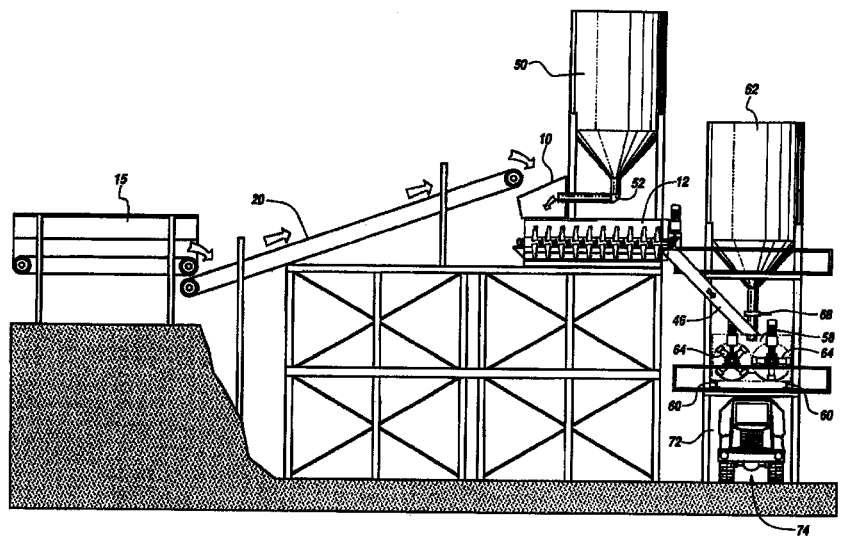

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *